US012048361B2

(12) United States Patent
Komlos (10) Patent No.: US 12,048,361 B2
(45) Date of Patent: *Jul. 30, 2024

(54) CASE FOR PORTABLE ELECTRONIC DEVICE (71) Applicant: Under Armour, Inc., Baltimore, MD (US)

(72) Inventor: Jedd Komlos, Baltimore, MD (US)

(73) Assignee: Under Armour, Inc., Baltimore, MD (US)

(*) Notice: Subject to any disclaimer, the term of this patent is extended or adjusted under 35 U.S.C. 154(b) by 164 days.

This patent is subject to a terminal disclaimer.

(21) Appl. No.: 17/368,031

(22) Filed: Jul. 6, 2021

(65) Prior Publication Data
US 2021/0330049 A1 Oct. 28, 2021

Related U.S. Application Data (63) Continuation of application No. 15/998,420, filed on Aug. 15, 2018, now Pat. No. 11,083,264.

(60) Provisional application No. 62/545,694, filed on Aug. 15, 2017.

(51) Int. Cl.
A45C 11/18 (2006.01)
A45C 11/00 (2006.01)
A45C 11/32 (2006.01)
A45C 13/02 (2006.01)
A45C 13/30 (2006.01)
H04B 1/3888 (2015.01)

(52) U.S. Cl.
CPC ............ *A45C 11/182* (2013.01); *A45C 11/00* (2013.01); *A45C 11/18* (2013.01); *A45C 11/321* (2013.01); *A45C 13/023* (2013.01); *H04B 1/3888* (2013.01); *A45C 2011/002* (2013.01); *A45C 2011/003* (2013.01); *A45C 13/30* (2013.01); *A45F 2200/0516* (2013.01)

(58) Field of Classification Search
CPC ....... A45C 11/182; A45C 11/00; A45C 11/18; A45C 11/321; A45C 13/023; A45C 13/30; A45C 2011/002; A45C 2011/003; H04B 1/3888; A45F 2200/0516
See application file for complete search history.

(56) References Cited

U.S. PATENT DOCUMENTS

| D631,246 S | 1/2011 | Boettner |
| D638,830 S | 5/2011 | Magness et al. |
| D640,680 S | 6/2011 | Magness et al. |
| 8,047,364 B2 | 11/2011 | Longinotti-Buitoni |

(Continued)

FOREIGN PATENT DOCUMENTS

KR 20160003555 U * 10/2016

*Primary Examiner* — Yuwen Pan
*Assistant Examiner* — Fatuma G Sherif
(74) *Attorney, Agent, or Firm* — Edell, Shapiro & Finnan, LLC (57) ABSTRACT A protective case for a portable electronic device includes a housing with an open tray and a resilient cord. The tray is recessed into the rear of the housing. The cord spans the opening of the tray, creating a cord pattern of overlapping segments capable of securing items placed into the tray. In an embodiment, the tray may be separated from the housing and the cord separated from the tray. A user may customize the cord layout by threading the cord across the tray opening in a desired pattern based on the goods within the tray.

20 Claims, 7 Drawing Sheets (56) References Cited

U.S. PATENT DOCUMENTS

| | | |
|---|---|---|
| D658,644 S | 5/2012 | Melanson et al. |
| 8,251,210 B2 | 8/2012 | Schmidt et al. |
| D673,548 S | 1/2013 | Weller et al. |
| D673,549 S | 1/2013 | Chang et al. |
| D673,551 S | 1/2013 | Chang et al. |
| 8,381,904 B1 | 2/2013 | Longinotti-Buitoni |
| D678,871 S | 3/2013 | Mishan et al. |
| D687,427 S | 8/2013 | Peterson |
| 8,646,736 B2 | 2/2014 | Berry |
| D703,650 S | 4/2014 | Ehrlich |
| 8,706,176 B1 | 4/2014 | Jia et al. |
| 8,757,376 B2 | 6/2014 | Azzoni |
| D712,894 S | 9/2014 | Drexler |
| 8,939,483 B2 | 1/2015 | Kim |
| D726,171 S | 4/2015 | Edwards |
| 9,027,746 B2 | 5/2015 | Smith |
| D738,872 S | 9/2015 | Erickson-Davis et al. |
| D746,805 S | 1/2016 | Kim |
| 9,456,066 B2 | 9/2016 | Singhal |
| 2006/0052064 A1 | 3/2006 | Goradesky |
| 2011/0077061 A1 | 3/2011 | Danze et al. |
| 2012/0168483 A1 | 7/2012 | Jambunathan et al. |
| 2013/0157730 A1 | 6/2013 | McCormac et al. |
| 2013/0292378 A1 | 11/2013 | Tages |
| 2013/0313252 A1* | 11/2013 | Chan ............... H05K 5/0004 220/4.02 |
| 2014/0091689 A1 | 4/2014 | Mishan et al. |
| 2014/0116897 A1* | 5/2014 | Wilkey ............. H04B 1/3888 206/37 |
| 2014/0228082 A1 | 8/2014 | Morrow et al. |
| 2015/0014306 A1 | 1/2015 | Tages |
| 2015/0244407 A1 | 8/2015 | Peral |
| 2015/0249730 A1* | 9/2015 | Larsen .............. H04M 1/05 248/342 |
| 2016/0173160 A1 | 6/2016 | Gronewoller et al. |

* cited by examiner

CASE FOR PORTABLE ELECTRONIC DEVICE

CROSS-REFERENCE TO RELATED APPLICATIONS

This application is a continuation of U.S. application Ser. No. 15/998,420, entitled "Case for Portable Electronics Device," and filed on Aug. 15, 2018, claims priority under 35 U.S.C. 119(e) to U.S. Provisional Patent Application Ser. No. 62/545,694, entitled "Case for Portable Electronic Device", filed Aug. 15, 2017, the disclosures of which are incorporated herein by reference in their entirety for all purposes.

FIELD OF THE INVENTION

The present invention relates to a case or cover for a portable electronic device.

BACKGROUND OF THE INVENTION

Portable electronic devices (e.g., smartphones, tablets, etc.) have become staple items that a person carries on his or her person. These portable electronic devices are often equipped with cases or covers to protect the portable electronic device from damage. Because portable electronic devices have become such a staple item, it has become conventional for portable electronic device protective cases to be configured as "wallet" cases, where the protective cases are configured to store credit cards, cash, identification cards, etc. However, the storage compartments of these conventional "wallet" cases are unable of being reconfigurable to conform to the intended item to be stored.

It would be desirable to provide a protective case for a portable electronic device that contains a storage compartment capable of storing a variety of different items. It would be further desirable for this storage compartment to be reconfigurable by the user to conform to the storage item such that the storage item is secured within the storage compartment. It would be further desirable to provide for a storage compartment that is capable of being removed from the protective case for utilization separate from the protective case.

SUMMARY

The present invention is directed toward a protective case or cover for a portable electronic device that includes a base structure, a tray structure, and a resilient member. The base structure may be configured to receive a portable electronic device such that the base structure is at least partially disposed around the portable electronic device. The base structure includes a front side and a rear side. An opening may be disposed on the rear side of the base structure. The tray structure may be removably coupleable to the base structure such that the tray structure, when coupled to the base structure, is disposed proximate to, and covers, the opening. The tray structure may include a series of sidewalls that collectively define a cavity configured to receive items. The resilient member may be removably coupleable to the tray structure in a variety of configurations, where the resilient member may be configured to secure items within the cavity of the tray structure.

In yet another embodiment, the protective case for a portable electronic device includes a base structure, a tray structure, and a resilient member. The base structure may be configured to receive a portable electronic device such that the base structure is at least partially disposed around the portable electronic device. The base structure includes a front side and a rear side. The tray structure may be removably coupleable to the base structure. The resilient member may be removably and reconfigurably coupleable to the tray structure.

In yet another embodiment, the protective case for a portable electronic device includes a base structure and a tray structure. The base structure may be configured to receive a portable electronic device such that the base structure is at least partially disposed around the portable electronic device. The base structure includes a front side and a rear side. An opening may be disposed on the rear side of the base structure. The tray structure may be removably coupleable to the base structure such that the tray structure, when coupled to the base structure, is disposed proximate to, and covers, the opening. In addition, the tray structure, when coupled to the base structure, may be visible through the opening of the base structure.

The present invention enables a user to store items within the cavity of the tray structure of the case that encloses their portable electronic device. The present invention further enables the user to reconfigure how the resilient member is coupled to the tray structure to best secure the items within the cavity of the tray structure. Furthermore, the items are stored on the protective case such that the user may be still capable of using the portable electronic device. The present invention further enables a user to remove the tray structure from the protective case to utilize the tray structure and resilient member separately from the base structure.

The above and still further features and advantages of the present invention will become apparent upon consideration of the following detailed description of specific embodiments thereof. In the detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DETAILED DESCRIPTION

The present invention relates to a protective case for a portable electronic device that includes a tray that defines an area of the case configured to store items within the tray. The case further includes a resilient member that may be reconfigured around the removable tray to secure items within the removable tray.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
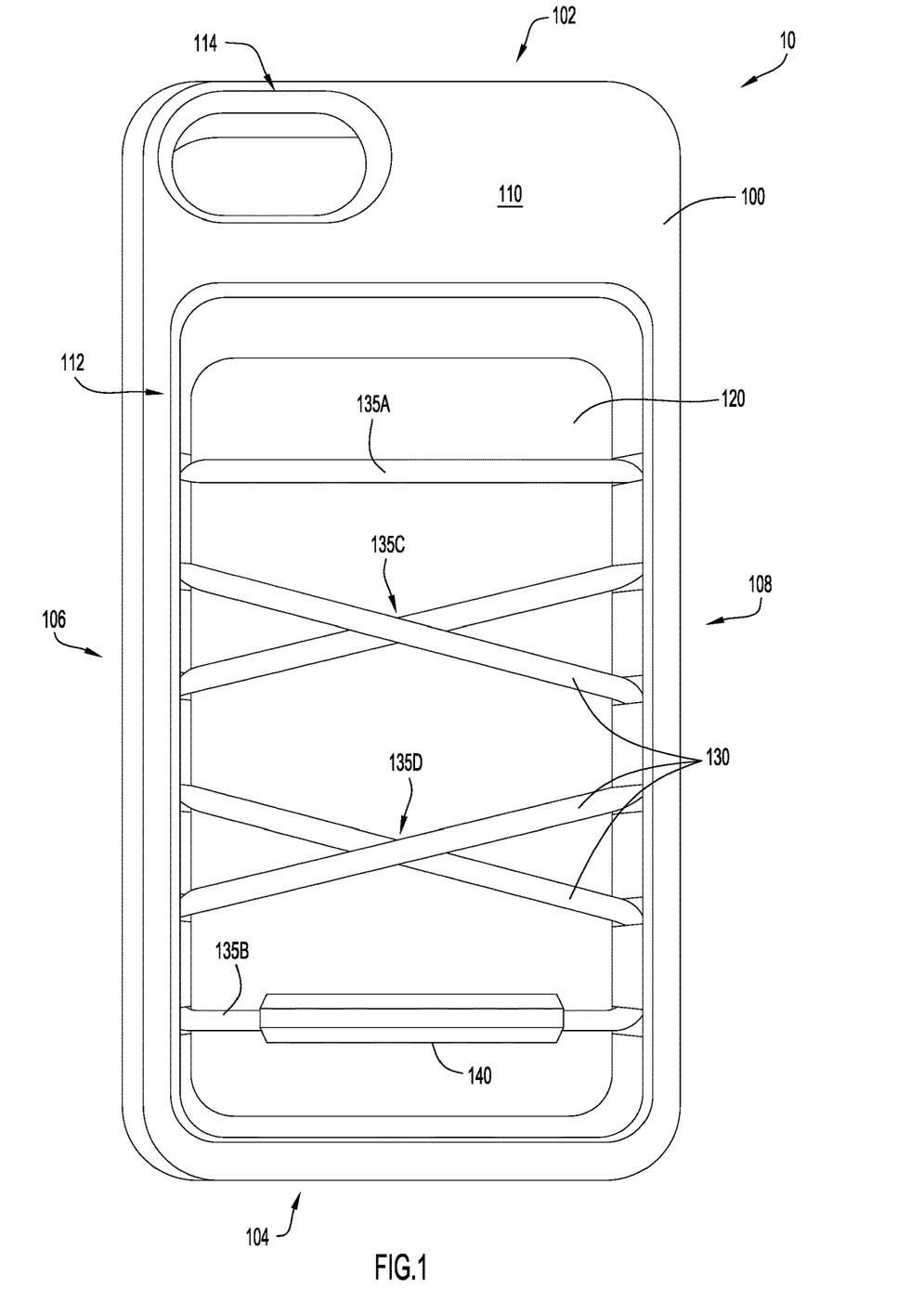
FIG. 1 illustrates a rear elevational view of an embodiment of a case according to the present invention.
Figure 2A:
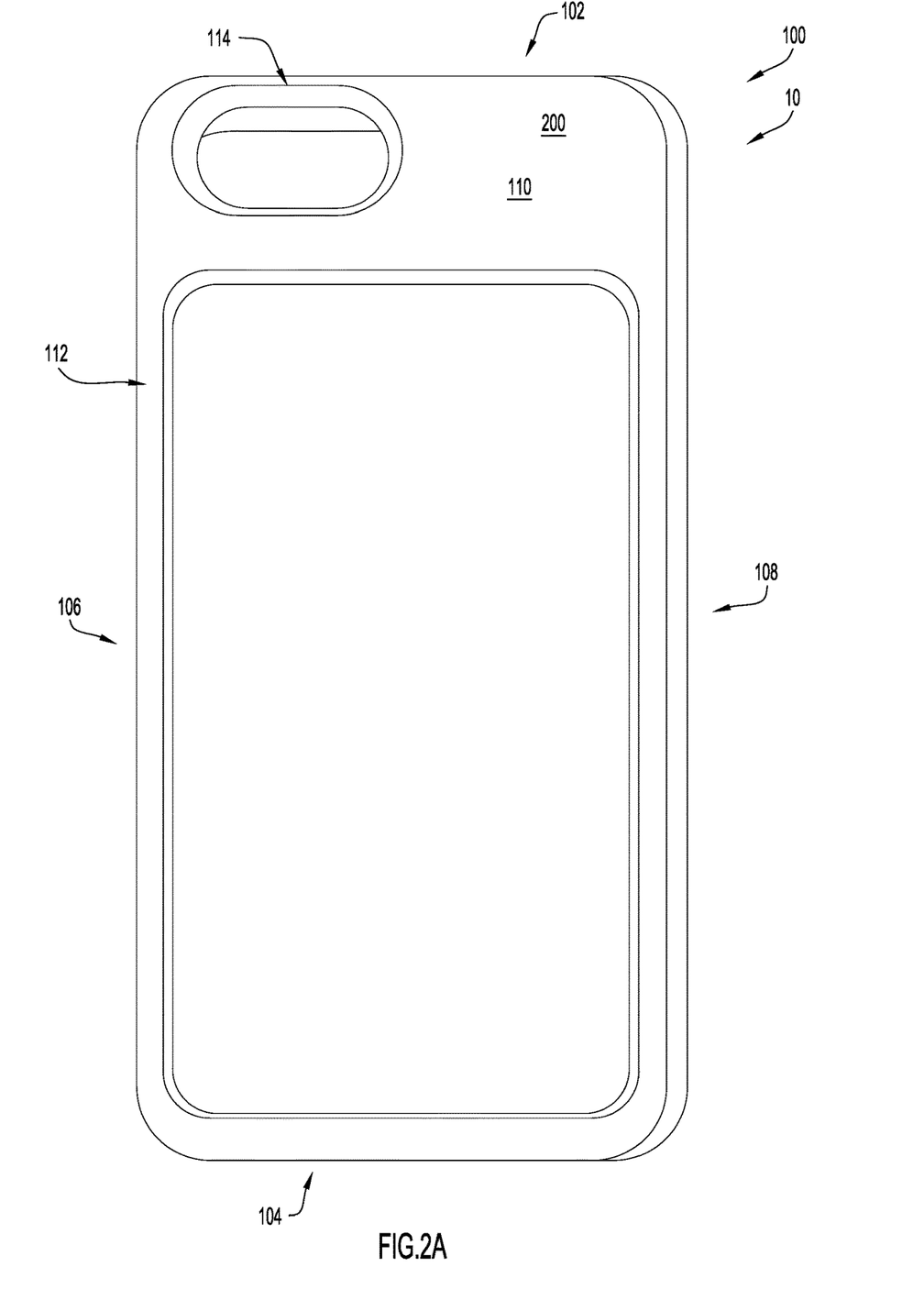
FIG. 2A illustrates a rear elevational view of the embodiment of the case illustrated in FIG. 1, where the removable tray is removed from the case.
Figure 2B:
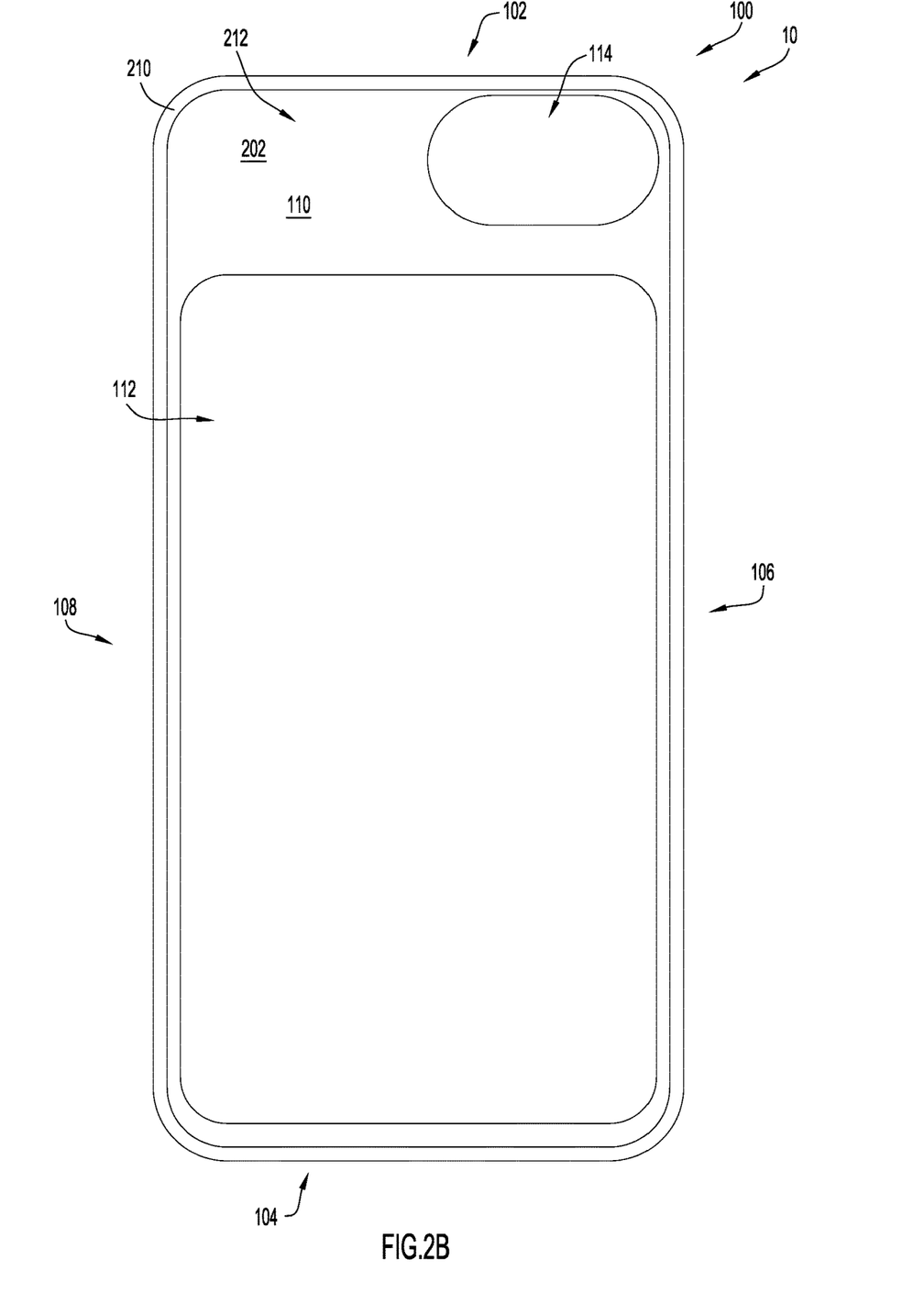
FIG. 2B illustrates a front elevation view of the embodiment of the case illustrated in FIG. 2A, where the removable tray is removed from the case.

With general reference to FIGS. 1, 2A, and 2B, a protective case or cover 10 for a mobile electronic device is shown. The case 10 may be configured to receive any type of mobile electronic device, including, but not limited to, smartphones, tablets, phablets, personal digital assistants (PDA), handheld gaming consoles, etc. The material forming the case 10 may be material suitable for its described purpose. In an embodiment, the case 10 is formed of impact-absorbing material such as a thermoplastic polyurethane (TPU). TPU while being durable, is resilient. The embodiment of the case 10 illustrated in FIGS. 1, 2A and 2B is configured to receive and be disposed around a smartphone. As shown, the case 10 includes a base structure or housing 100, a tray structure or tray 120, and a resilient member or cord 130. When coupled, the base structure 100 and tray 120 cooperate to form a cavity that receives and houses the electronic device.

The base structure 100 includes a top side 102, a bottom side 104 opposite the top side 102, a first side 106, and a second side 108 opposite the first side 106. The base structure 100 further includes a back or rear side 110 and an opposite front side 210. As illustrated in FIGS. 1, 2A, and 2B, the rear side 110 of the base structure 100 includes a first or tray opening (also referred to herein as a window) 112 and a second or camera opening (also referred to herein as a window) 114. As best illustrated in FIGS. 2A and 2B, the rear side 110 defines an exterior surface 200 and an interior surface 202. The first and second openings 112, 114 extend through the rear side 110, from the exterior surface 200 to the interior surface 202. The first opening 112 may be larger in size than the second opening 114. As illustrated, the first opening 112 is substantially rectangular, and is disposed on the rear side 110 of the base structure 100 proximate to the bottom side 104, the first side 106, and the second side 108. The second opening 114 may also be substantially rectangular and/or oval. The second opening 114 may be disposed on the rear side 110 of the base structure 100 proximate to the first side 106 and the top side 102. The first opening 112 is sized and shaped to receive the tray 120, while the second opening 114 is sized and shaped to correspond/align with the camera of a portable electronic device disposed within the case 10.

The front side 210 of the base structure 100 may be configured to receive the portable electronic device so that the base structure at least partially surrounds or encloses the portable electronic device. The front side 210 of the base structure 100 includes a third or front opening (also referred to herein as a window) 212 that enables the base structure 100 to receive a portable electronic device such that the device is located between the front side 210 and the rear side 110. The third opening 212 may also be substantially rectangular and may be generally centrally disposed along the front side 110 (e.g., the opening may be spaced equidistant from the top, bottom, first, and second sides 102, 104, 106, 108 of the base structure 100). The size of the front opening 212 enables a portable electronic device to be inserted into the base structure 100 through the third opening 212, while still enabling a portion of the front side 210 to surround a portion of the portable electronic device when disposed within the base structure 100. In addition, the third opening is the primary window utilized to operate the device by accessing (contacting) the device's screen, buttons and/or keyboard. Accordingly, a user is able to use the device even when the device is housed within the base structure 100.

Positioning the portable electronic device within the base structure 100 when the tray 120 is aligned with the first opening 112 of the base structure 100 and/or coupled to the base structure at the first opening 112 secures the tray 120 between the interior surface 202 of the rear side 110 of the base structure 100 and the portable electronic device. When the tray 120 is uncoupled/removed from the base structure 100, as illustrated in FIGS. 2A and 2B, and a portable electronic device is disposed within the base structure 100, a portion of the portable electronic device may be visible through the first opening 112.

Figure 3:
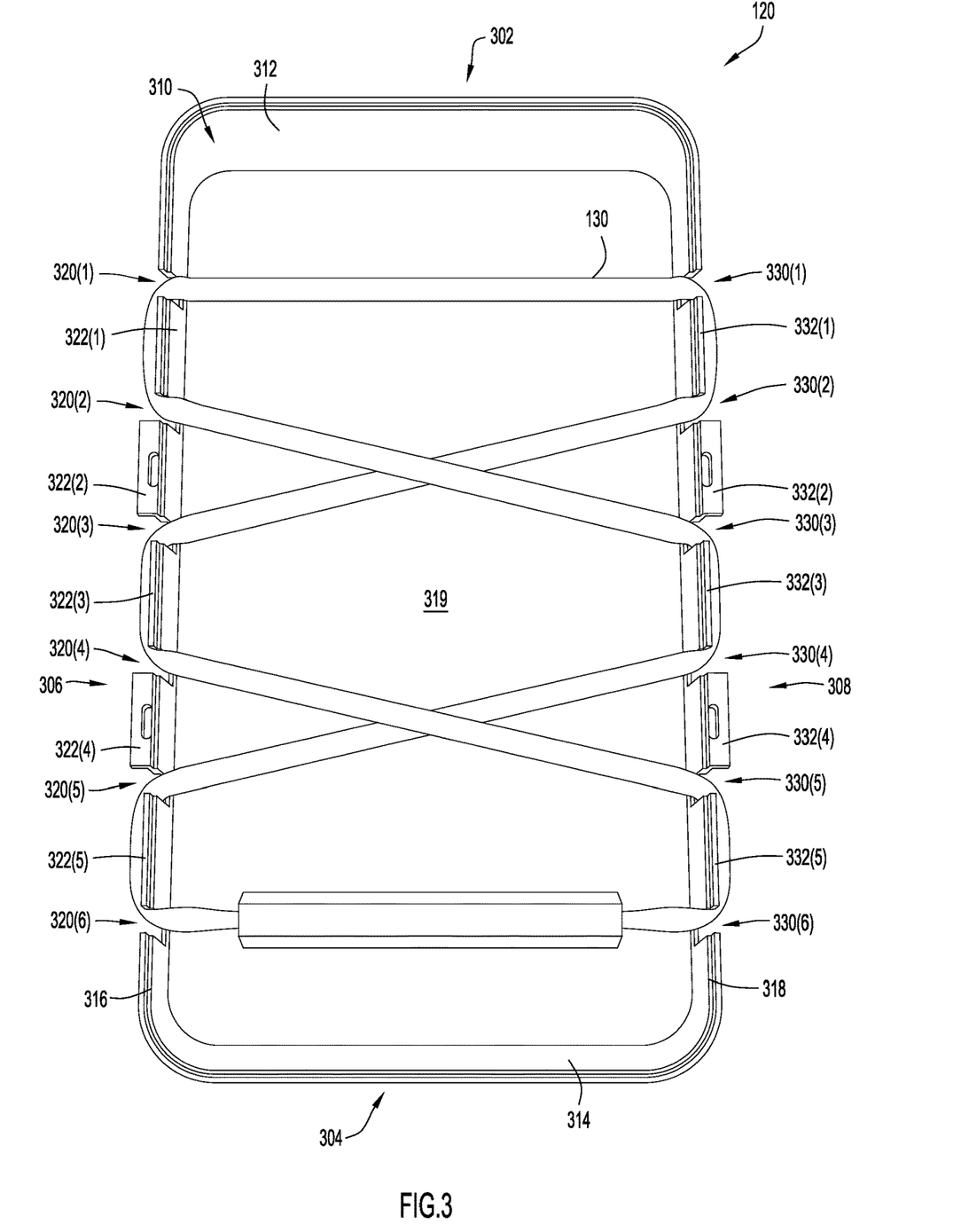
FIG. 3 illustrates a top view of the removable tray of the embodiment of the case illustrated in FIG. 1.

As best illustrated in FIG. 3, the tray 120 is an open container possessing a substantially rectangular shape and having a top side 302, a bottom side 304 opposite the top side 302, a first side 306 spanning between the top side 302 and the bottom side 304, and a second side 308 opposite the first side 306. The top side 302 of the tray 120 includes a top sidewall 312, while the bottom side 304 includes a bottom sidewall 314. Furthermore, the first side 306 of the tray 120 includes a first sidewall 316, and the second side 308 includes a second sidewall 318. The sidewalls 312, 314, 316, 318 extend upward from a tray surface or floor 319 to collectively form an open cavity or well 310 inset into the base structure 100 (i.e., the tray floor is recessed relative to the rear side 110 of the base structure 100). The tray cavity 310 is configured to receive (thus is capable of receiving) objects/items such as, but not limited to, keys, key fobs, dollar bills, identification cards, credit cards, earbuds, etc. The depth of the tray cavity is not particularly limited. By way of example, the depth tray cavity may be two millimeters to 6 millimeters.

Figure 4:
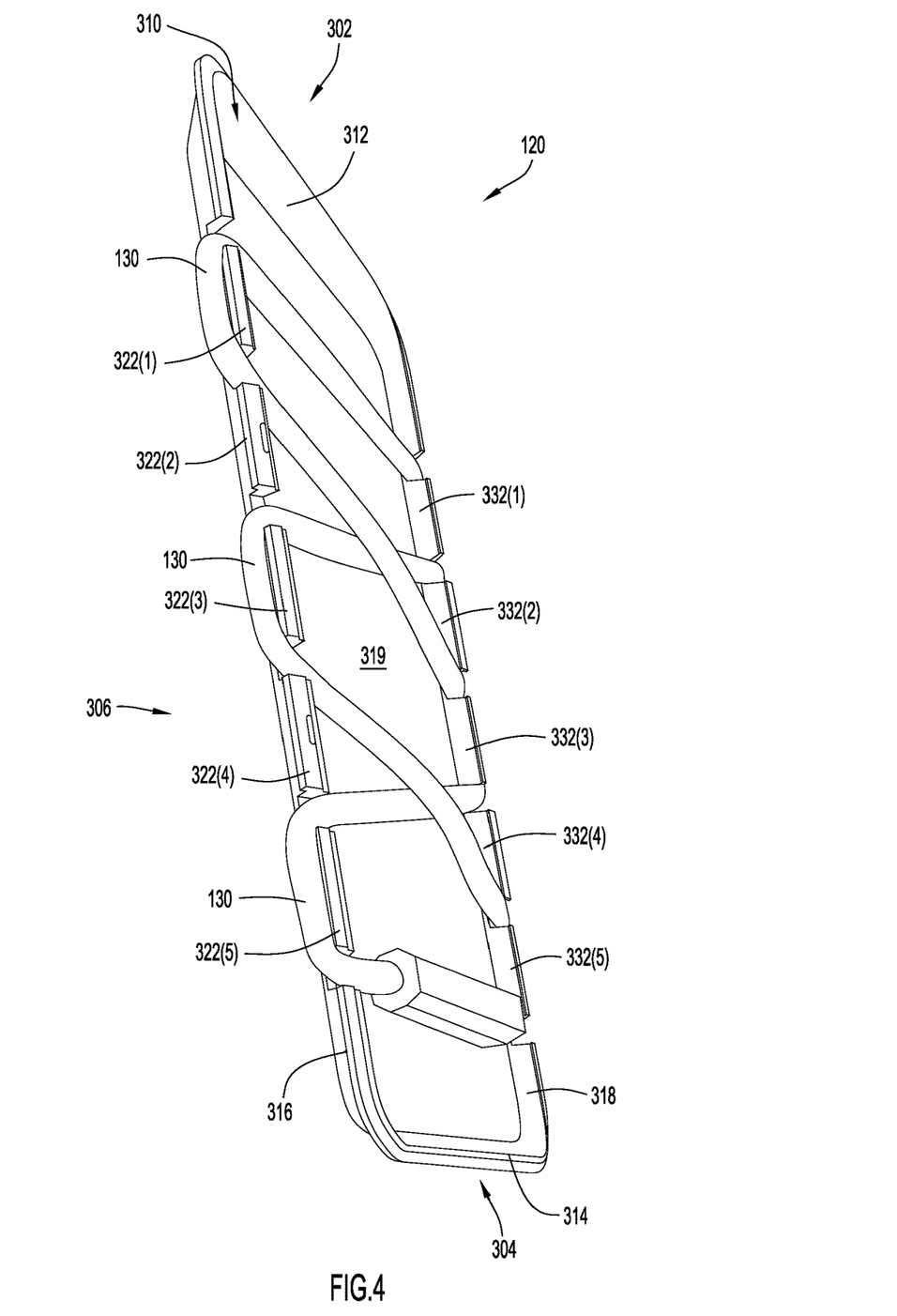
FIG. 4 illustrates a side elevational view of the embodiment of the removable tray illustrated in FIG. 3.
Figure 5:
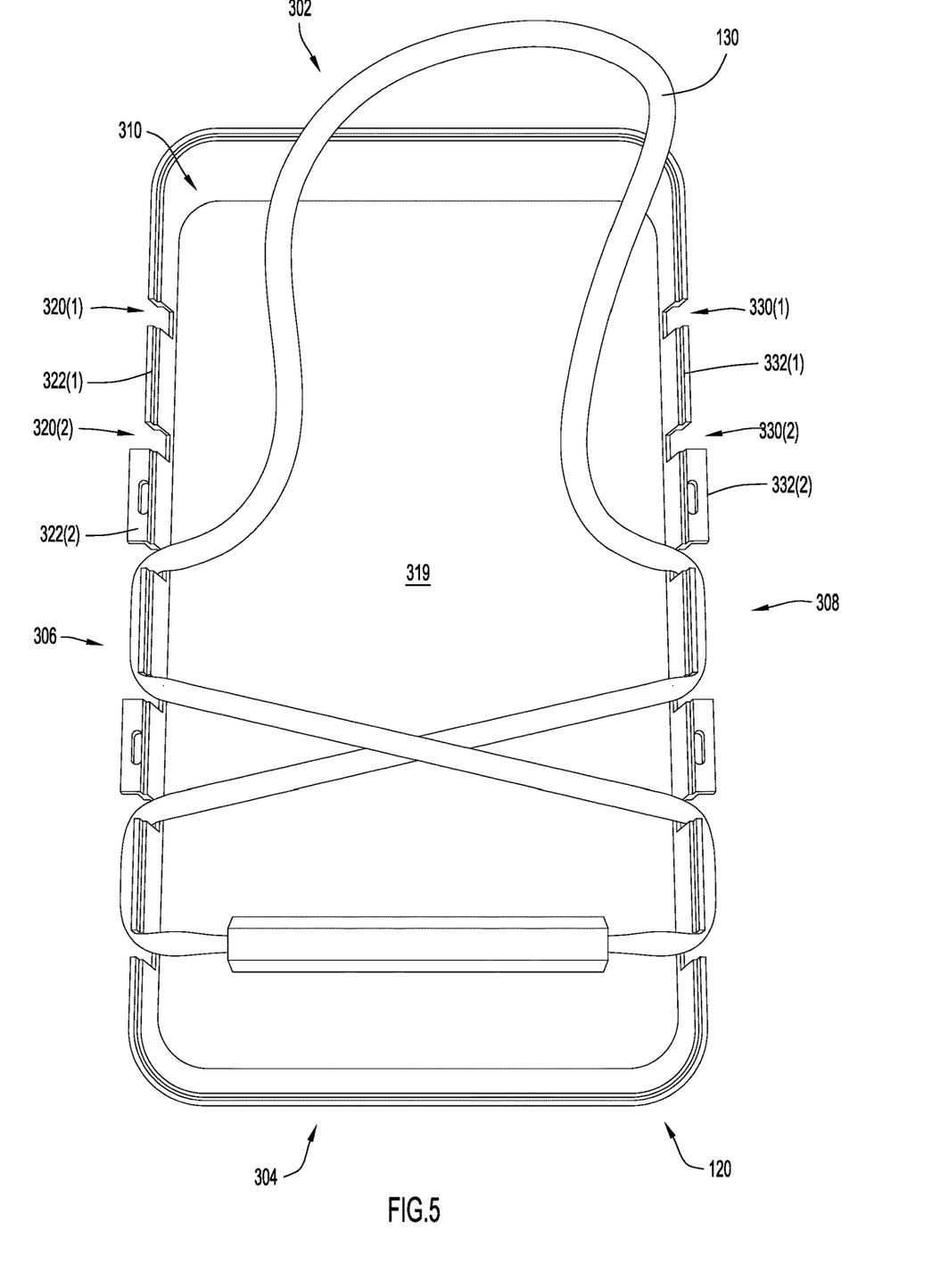
FIG. 5 illustrates top view of the embodiment of the removable tray illustrated in FIG. 3, where the resilient member is partially removed from the removable tray.

As best illustrated in FIGS. 3-5, the bottom 314, first 316, and second 318 sidewalls extend upward from the tray surface 319 at an angle that is substantially perpendicular to the tray surface 319. The top sidewall 312, however, extends upward from the tray surface 319 at an angle that is offset from perpendicular (i.e., the top sidewall 312 extends from the tray surface 319 at an angle with respect to the tray surface 319 that is greater than perpendicular with respect to the tray surface 319 (e.g., the sidewalls form an obtuse angle with the tray surface)). As further explained below, the angle of the top sidewall 312 enables objects/items to be slid into the cavity 310 of the tray 120 along the top sidewall 312.

Continuing with FIGS. 3-5, the top sidewall 312 extends continuously across the top side 302 of the tray 120 from the first side 306 to the second side 308. Similarly, the bottom sidewall 314 extends continuously across the bottom side 304 of the tray 120 from the first side 306 to the second side 308. The sidewalls 316, 318 of the first and second sides 306, 308, however, differ from the sidewalls 312, 314 of the top and bottom sides 302, 304. Disposed within the first sidewall 316 is a series of equally spaced and sized slots 320(1)-320(6) that collectively define a series of equally sized and spaced tabs or hooks 322(1)-322(5). The slots are open slots, defining a slot mouth proximate the top of the sidewall 316, 318. Similarly, the second sidewall 318 includes a series of equally spaced and sized, open slots 330(1)-330(6) that collectively define a series of equally sized and spaced tabs or hooks 332(1)-332(5). As best illustrated in FIG. 3, the slots 320(1)-320(6) of the first sidewall 316 are aligned in a widthwise or transverse direction (i.e., across the width of the tray 120) with the slots 330(1)-330(6) of the second sidewall 318. The tabs 322(1)-322(5) of the first sidewall 316 are similarly aligned in the widthwise or transverse direction (i.e., across the width of the tray 120) with the tabs 332(1)-332(5) of the second sidewall 318. The slots are configured to receive the resilient member 130 (discussed in greater detail below).

The tray 120, moreover, may be separable from the base structure 100. Specifically, the tabs 322(1)-322(5), 332(1)-332(1) may be configured to frictionally engage the edges of the first opening 112 of the base structure 100. The hooks 322(1)-322(5), 332(1)-332(1), moreover, are resilient, being compressible to disengage the base structure. Once the tray 120 is separated from the base structure 100, a user can release and attach the resilient member 130 from the tray 120.

The tray 120 is approximately equal in size and shape to that of the first opening 112 of the base structure 100 so that, as illustrated in FIG. 1, when the tray 120 is coupled to the base structure 100, the tray 120 occupies and covers the first opening 112. More specifically, the sidewalls 312, 314, 316, 318 of the tray 120 align with the edges of the first opening 112. It then follows that the tabs 322(1)-322(5), 332(1)-332(1) are also aligned with the edges of the first opening 112 such that the slots 320(1)-320(6), 330(1)-330(6) become passageways collectively defined by edge of the first opening 112 of the base structure 100 and the tabs 322(1)-322(5), 332(1)-332(5).

The resilient member or cord 130 is a strand having stretch (amount of elongation) and recovery power (ability to return to its original shape/dimensions). The resilient member 130 may be in the form of a band, tether, cord, string, rope, cable, wire, etc. The resilient member 130 may be constructed from a resilient and elastic material, such as, but not limited to, natural rubber, synthetic rubber, elastane, etc. Furthermore, the resilient member 130 may include a fabric sheath or covering (e.g., braided cotton or nylon yarns) the surrounds/covers the core material of the resilient member 130. The fabric covering may be configured to stretch with the core material when the resilient member 130 is stretched.

As FIGS. 3-5 illustrate, the resilient member 130 may be removably coupled to the tray 120 by positioning the resilient member 130 within the plurality of the slots 320(1)-320(6), 330(1)-330(6) (e.g., by threading it through selected slots). When disposed/positioned within the plurality of slots 320(1)-320(6), 330(1)-330(6), the resilient member 130 is at least partially wrapped around a plurality of the tabs 322(1)-322(5), 332(1)-332(5). As best illustrated in FIG. 4, when the resilient member 130 is positioned/disposed within the plurality of slots 320(1)-320(6), 330(1)-330(6), the resilient member 130 may extend around the outer side of the tabs 322(1)-322(5), 332(1)-332(5). With this configuration, the resilient member 130 passes into and out of the cavity that houses the electronic device (via the slots 320(1)-320(6), 330(1)-330(6)).

The resilient member 130 may be coupled to the tray 120 in a variety of configurations, where FIGS. 1, 3, and 4 only illustrate one configuration of the resilient member 130 coupling. The resilient member 130 may be disposed within any number of the slots 320(1)-320(6), 330(1)-330(6), and wrapped around any number of the tabs 322(1)-322(5), 332(1)-332(5) that enables the resilient member 130 to be coupled to the tray 120. The resilient member 130 may be coupled to the tray 120 in a configuration that is best suited for securing a user's desired items within the cavity 310 of the tray 120. In any configuration, the resilient member 130 passes into and out of the housing defined by the base structure 100 via the slots, spanning the dimensions of the tray 120. In one configuration, the resilient member 130 includes a first transverse segment 135A, a second transverse segment 135B, first pair of overlapping or angled segments 135C, and a second pair of overlapping or angled segments 135D. One or more segments 135A-135D may further include a sleeve 140 that covers a portion of a segment. The sleeve 140 may be a cylinder that surrounds the resilient member 130, providing a grasping element (to aid in cord manipulation), as well as applying additional force to objects stored within the tray (e.g., frictional force). The sleeve 140 may be formed of a flexible and/or high friction polymer such as an elastomer (e.g., rubber, thermoplastic polyurethane or silicone).

Once the tray 120 is secured to the base structure 100, the slots become closed and the resilient member 130 is secured, becoming captured within the slots. Accordingly, the resilient member 130 may be reconfigured on the tray 120 only when the tray 120 is uncoupled from the base structure 100. When the tray 120 is coupled to the base structure 100, the coupling configuration of the resilient member 130 is secured in its position. As illustrated in FIG. 1, coupling the tray 120 to the base structure prevents the resilient member 130 from sliding out from the slots 320(1)-320(6), 330(1)-330(6) of the tray 120. As further illustrated, the portions of the resilient member 130 disposed around the outer surface of the tabs 322(1)-322(5), 332(1)-332(5) are covered by the base structure 100 to secure the resilient member 130 within the slots 320(1)-320(6), 330(1)-330(6). While the resilient member 130 may be reconfigured when the tray 120 is uncoupled from the base structure 100, the resilient member 130 may be retained in the slots 320(1)-320(6), 330(1)-330(6) and disposed around the tabs 322(1)-322(5), 332(1)-332(5) until a user manually manipulates the resilient member 130 to be removed from the slots 320(1)-320(6), 330(1)-330(6) and/or disposed away from the tabs 322(1)-322(5), 332(1)-332(5). Thus, the resilient member 130 may still function to retain objects within the cavity 310 of the tray 120 when uncoupled from the base structure 100, enabling the tray 120 to be utilized independent of the base structure 100.

Figure 6:
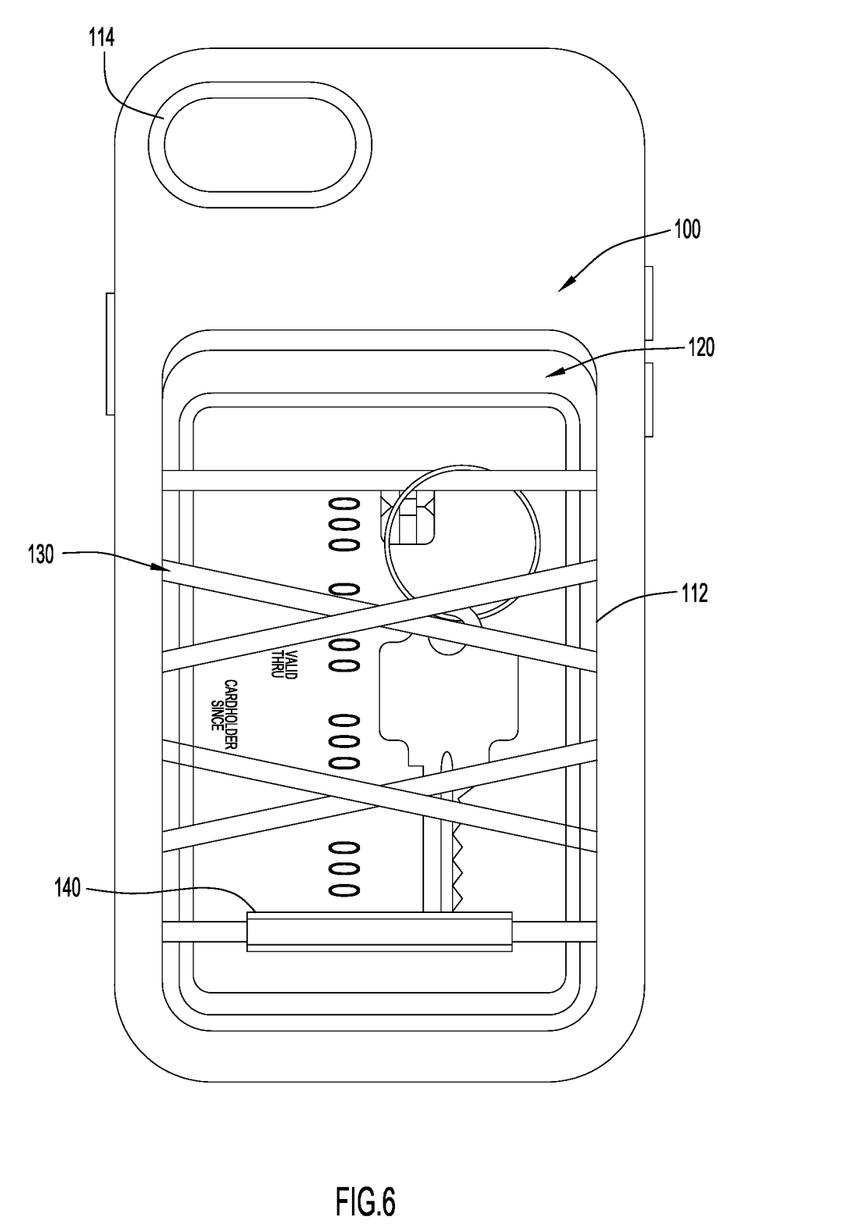
FIG. 6 illustrates a rear view of the case of FIG. 2A with stored items.

With this configuration, the case 10 includes an open, recessed cavity and a resilient member 130 with intersecting and/or overlapping cord segments configured to capture items within the tray. Referring to FIG. 6, items may be slid into the tray 120 (as shown by the card) and/or attached to the resilient member 130 (as shown by the key chain).

When equipped on a portable electronic device, the case 10 disclosed herein enables a user to store and secure items within the cavity 310 of the tray 120. This enables a user to locate and carry items (e.g., smartphone, credit card, money, keys, identification cards, etc.). This may be particularly useful when a user does not have pockets or other means for storing these items, (i.e., working out, hiking, etc.). The angling of the top sidewall 312 with respect to the tray surface 319 enables a user to slide the designed items along the tip sidewall 312 and between the resilient member 130 and the tray surface 319 of the tray 120. In other words, the angling of the top sidewall 312 with respect to the tray surface 319 prevents the user of the case 10 from having to manually pull the resilient member 130 away from the tray surface 319 to position items within the cavity 310 of the tray 120 between the tray surface 319 and the resilient member 130. The ability to remove the tray 120 from the base structure 100 further enables the user to take some of the items (e.g., the ones disposed within the cavity 310 of the tray 120) with them when they wish to leave their portable electronic device behind. Furthermore, as explained above, the coupling configuration of the resilient member 130 enables a user to customize how the resilient member 130 is coupled to the tray 120 to best secure the desired items within the cavity 310 of the tray 120.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A protective case for a portable electronic device, the protective case comprising:
    a base structure configured to receive the portable electronic device;
    a tray structure removably coupled to the base structure, the tray structure including a plurality of slots disposed along opposing edges of the tray structure; and
    a resilient member removably coupled to the tray structure by engaging portions of the resilient member with selected slots of the plurality of slots, the resilient member comprising a closed loop of resilient material;
    wherein the resilient member is configured to be removed from the tray structure while remaining as a closed loop of resilient material and re-coupled with the tray structure in a plurality of different configurations while remaining as a closed loop of resilient material in which portions of the resilient member are oriented with different sets of slots.

2. The protective case of claim 1, wherein the base structure includes an opening, and the tray structure is removably coupled to the base structure proximate to the opening.

3. The protective case of claim 2, wherein the tray structure covers the opening when the tray structure is coupled to the base structure.

4. The protective case of claim 2, wherein the opening is a first opening disposed proximate to a bottom side of the base structure, the protective case further comprising:
    a second opening disposed in the base structure proximate to a top side of the base structure.

5. The protective case of claim 1, wherein the tray structure further comprises:
    a top sidewall extending from a top side of the tray structure;
    a bottom sidewall extending from a bottom side of the tray structure;
    a first sidewall extending from a first side of the tray structure; and
    a second sidewall extending from a second side of the tray structure, wherein the sidewalls collectively define a cavity on the tray structure.

6. The protective case of claim 5, wherein the first sidewall includes a first plurality of slots and tabs, and the second sidewall includes a second plurality of slots and tabs.

7. The protective case of claim 1, further comprising a sleeve coupled with the resilient member to provide a grasping element that aids in manipulation of the resilient member.

8. The protective case of claim 1, wherein the resilient member is configured to secure an item to the tray structure.

9. A protective case for a portable electronic device, the protective case comprising:
    a base structure configured to receive the portable electronic device;
    a tray structure removably coupled to the base structure, wherein the tray structure is configured to be secured between an interior surface of the base structure and the portable electronic device when the portable electronic device is received by the base structure; and a resilient member comprising a closed loop of resilient material that is removably and reconfigurably coupled to the tray structure such that the resilient member may be coupled to the tray structure when the tray structure is uncoupled from the base structure;

wherein the resilient member is configured to be removed from the tray structure and re-coupled with the tray structure in a plurality of different configurations and while remaining as a closed loop of resilient material.

10. The protective case of claim 9, wherein the base structure includes an opening.

11. The protective case of claim 10, wherein the tray structure, when coupled to the base structure, is aligned with the opening.

12. The protective case of claim 9, wherein the resilient member is removable and reconfigurable when the tray structure is uncoupled from the base structure.

13. The protective case of claim 12, wherein the tray structure further comprises:
a top sidewall extending from a top side;
a bottom sidewall extending from a bottom side;
a first sidewall extending from a first side; and
a second sidewall extending from a second side, wherein the sidewalls collectively define a cavity on the tray structure.

14. The protective case of claim 13, wherein the first sidewall includes a first series of equally spaced first slots and first tabs, and the second sidewall includes a second series of equally spaced second slots and second tabs.

15. The protective case of claim 14, wherein:
the resilient member is removably coupled to the tray structure when disposed within at least one of the first slots or second slots, and
the resilient member is reconfigurable as to which of the first slots and the second slots the resilient member is disposed within.

16. A protective case for a portable electronic device, the protective case comprising:
a base structure configured to receive the portable electronic device;
a tray structure removably coupled to the base structure, the tray structure having a series of sidewalls that collectively define a cavity;
a resilient member comprising a closed loop of resilient material that is removably and reconfigurably coupled to the tray structure such that the resilient member may be coupled to the tray structure when the tray structure is uncoupled from the base structure, wherein the resilient member is removable and reconfigurable when the tray structure is uncoupled from the base structure; and
a sleeve coupled with the resilient member to provide a grasping element that aids in manipulation of the resilient member;
wherein the resilient member is configured, while remaining as a closed loop of resilient material, to be removed from the tray structure and re-coupled with the tray structure in a plurality of different configurations and in which portions of the resilient member are oriented with different sets of slots.

17. The protective case of claim 16, wherein the series of sidewalls include a first sidewall and a second sidewall, the first sidewall having a first series of equally spaced first slots and first tabs, and the second sidewall having a second series of equally spaced second slots and second tabs.

18. The protective case of claim 17, wherein:
the resilient member is removably coupled to the tray structure when disposed within at least one of the first slots or second slots, and
the resilient member is reconfigurable as to which of the first slots and the second slots the resilient member is disposed within.

19. The protective case of claim 16, wherein the tray structure is configured to be secured between an interior surface of the base structure and the portable electronic device when the portable electronic device is received by the base structure.

20. The protective case of claim 19, wherein the base structure includes an opening, and the tray structure is disposed proximate to the opening when coupled to the base structure.

* * * * *